INVENTOR.
KEITH SLATER
BY Hamilton & Cook
ATTORNEYS

United States Patent Office 3,518,058
Patented June 30, 1970

3,518,058
APPARATUS AND METHOD FOR DETECTING THE CARBON MONOXIDE CONTENT OF A GAS MIXTURE
Keith Slater, Guelph, Ontario, Canada, assignor of one-third to Richard N. Horger and one-third to Joseph Bango, Jr., both of Canton, Ohio
Filed Oct. 2, 1967, Ser. No. 672,278
Int. Cl. G01n 25/00, 31/10
U.S. Cl. 23—232                         10 Claims

ABSTRACT OF THE DISCLOSURE

A method and apparatus for detecting and warning of the presence of dangerous concentrations of carbon monoxide in a gas mixture including introducing the gas mixture to be tested into a closed reaction chamber, exposing the gas mixture in the presence of heat for conversion of any carbon monoxide present to gaseous nickel carbonyl, passing the resultant product through a temperature environment sufficiently high to cause decomposition of the nickel carbonyl and deposition of nickel on a filter, and measuring by an electrical sensor the rate of change in electrical conductivity of the filter as nickel is deposited thereon as an indication of the concentration of carbon monoxide in the gas mixture.

BACKGROUND OF THE INVENTION

Due to its colorless and odorless characteristics, carbon monoxide remains a significant cause of human fatality by poisoning. The human body has generally a low tolerance to carbon monoxide gas in that a concentration of approximately .05% over an extended time period or 1% for a few minutes constitutes a fatal dosage. This combination of high toxicity and the colorless and odorless nature of the gas produces an extremely lethal gas, because its presence in an atmosphere may not be detected by a potential victim until its effects render him incapable of timely recovery.

The serious nature of this threat to human life, as evidenced by an appreciable annual death rate, has prompted the development of numerous quantitative procedures for detecting the presence and concentration of carbon monoxide in a closed environment. A common type of analytical process has involved the oxidizing of the carbon monoxide to form carbon dioxide with the released heat providing a quantitative indication of the amount of carbon monoxide present; however, such devices normally require complex, expensive equipment to complete the conversion and compensate for variations in ambient temperature. A number of other devices have been designed to measure the heat developed in catalytically converting the carbon monoxide and measuring the heat released. Such devices have the disadvantages of significant errors caused by gas or water by-products reacting with the catalyst, variations in ambient temperature or pressure, and the necessity for elaborate calibration or use in a substantially uncontaminated atmosphere. Other devices have employed chemical reactions to achieve a color conversion which is evaluated in conjunction with a standard chart, thereby accentuating the possibility of human error.

Thus, the prior devices have generally been quite complicated and designed individually to minimize disadvantages for use in a particular environment.

SUMMARY OF THE INVENTION

Accordingly, the present invention provides a method and apparatus for improved detection and evaluation of the carbon monoxide content of a closed environment; provides a method and apparatus which are adaptable for use in a variety of different environments where carbon monoxide may be present in dangerous quantities, including automobiles, aircraft, submarines, coal mines; provides a method and apparatus which can be adjustably preset to give suitable warning of the presence of carbon monoxide in a wide range of concentrations; provides a method and apparatus generating an electric signal which can actuate an audio or video warning signal when a test environment reaches a preset carbon monoxide concentration; provides a method and apparatus which will monitor low concentrations of carbon monoxide over extended time periods without deleterious effects on the system components and yet react to increased concentrations exceeding the danger level; and provides apparatus which is sufficiently compact to be readily portable, which can be inexpensively manufactured, and which is sufficiently noncomplex so as to be highly reliable and relatively maintenance free.

DESCRIPTION OF A PREFERRED EMBODIMENT

Figure 1:
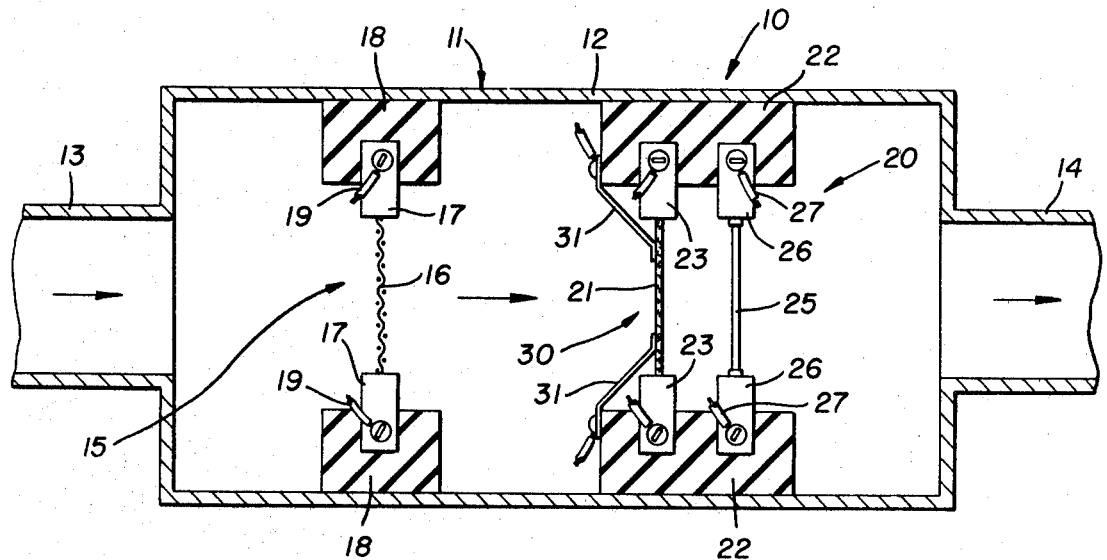
FIG. 1 is a side section elevation depicting apparatus suitable for the method of measuring and indicating the carbon monoxide content of a gas mixture according to the present invention.

Referring generally to the drawings and particularly to FIG. 1 thereof, a carbon monoxide measuring and indicating device, generally indicated by the numeral 10, is depicted for the purpose of describing apparatus and process steps according to the present invention. As shown, a gastight reaction chamber 11 provides a closed environment through which the gas to be tested is directed. For purposes of convenience in construction, the reaction chamber 11 may have a generally cylindrical central housing 12 which spaces and sealingly joins an inlet passage 13 and an outlet passage 14, each of which may be of a reduced diameter.

A sampling of the gas mixture to be tested is introduced, periodically or continuously, as desired, through the inlet passage 13 to the interior of the central housing 12 of reaction chamber 11. A controlled introduction of the gas sample to be tested may be achieved by suitable propulsion means such as a fan (not shown) in the inlet passage 13 or an attachment thereto. Any other apparatus capable of producing a flow of the gas mixture through the housing 12, as indicated in FIG. 1 is equally applicable.

The reaction chamber 11 is appropriately fitted, as described in detail hereinafter, to employe generally the reactions of the known Mond process for the purification of nickel. This process involves first subjecting an impure nickel sample to carbon monoxide at approximately 140° F. to form a volatile nickel carbonyl. Subsequently, this compound is subjected to a higher temperature, on the order of 300° F., causing a thermal decomposition which releases carbon monoxide and deposits pure nickel.

According to the exemplary embodiment of the invention, the test sample of gas entering through the inlet passage 13 is first exposed or introduced into a volatilizing device, generally indicated by the numeral 15, which compounds any carbon monoxide in the test sample with available nickel and in the presence of heat forms a gaseous compound. As shown, the volatilizing device 15 has a nickel gauze screen 16 or similar porous member through which the gas sample must pass in order to provide exposure to nickel. The gauze screen 16 may be in the form of an electrically heated filament attached to suitable contacts 17, electrically and thermally insulated from the central housing 12 by blocks 18, and connected by the leads 19 to an appropriate source of electrical energy which will create a temperature of approximately 140° F.; however, any heating device capable of attaining this temperature proximate to the gauze screen 16 can be employed. The carbon monoxide entrained in the gas sample exposed to volatilizing device 15 is thereby converted to gaseous nickel carbonyl, $Ni(CO)_4$.

The gas test sample continues to flow through the reaction chamber 11 (left to right in FIG. 1) into a decomposition device, generally indicated by the numeral 20, which reduces the nickel carbonyl component. The decomposition device preferably has a glass fiber filter 21, or other gas porous, electrically nonconductive material capable of withstanding temperatures in excess of 300° F. The glass fabric 21 is mounted on insulating blocks 22 as by clips 23 to achieve electrical isolation from the housing 12 and is preferably indirectly heated by a heating element 25 which is placed adjacent, but slightly beyond it. The heating element 25 may be a Calrod unit, as shown, or any similar heating device and may be mounted on the insulating blocks 22 by clips 26 and provided with leads 27 connected to an electrical source capable of providing power to generate sufficient energy in heating element 25 to raise the temperature of the glass fabric 21 to approximately 300° F.

According to the Mond process, when the temperature of the gas test sample passing through the reaction chamber 11 reaches 300° F., the nickel carbonyl present decomposes, releasing and depositing nickel on the fibers of the glass fabric 21 and releasing carbon monoxide. The released carbon monoxide along with the other constituents of the test sample pass out of the reaction chamber via the outlet passage 14. Depending upon the concentrations of carbon monoxide to be encountered and other servicing requirements, the screen 16, glass fabric 21, and heating element 25 may be plug-in units or other similar readily replaceable components for ease of servicing by allowing periodic replacement.

The rate at which nickel is deposited on the glass fabric 21 constitutes an indication of the concentration of carbon monoxide gas in the test sample. A new glass fiber filter 21 with no nickel deposits will have an extremely high electrical resistance which is not appreciably varied where the passing test sample has little or no carbon monoxide content. As nickel is deposited on the glass filter 21, the electrical resistance increase is measured by a sensing device, generally indicated by the numeral 30. The sensing device 30 has spaced electrodes or contact arms 31 which are attached to the insulating blocks 22, engage the surface of the glass filter 21 at a spaced interval over which the resistance is measured, and are provided with leads 32 (not shown) which may be connected to remote measuring devices.

Figure 2:
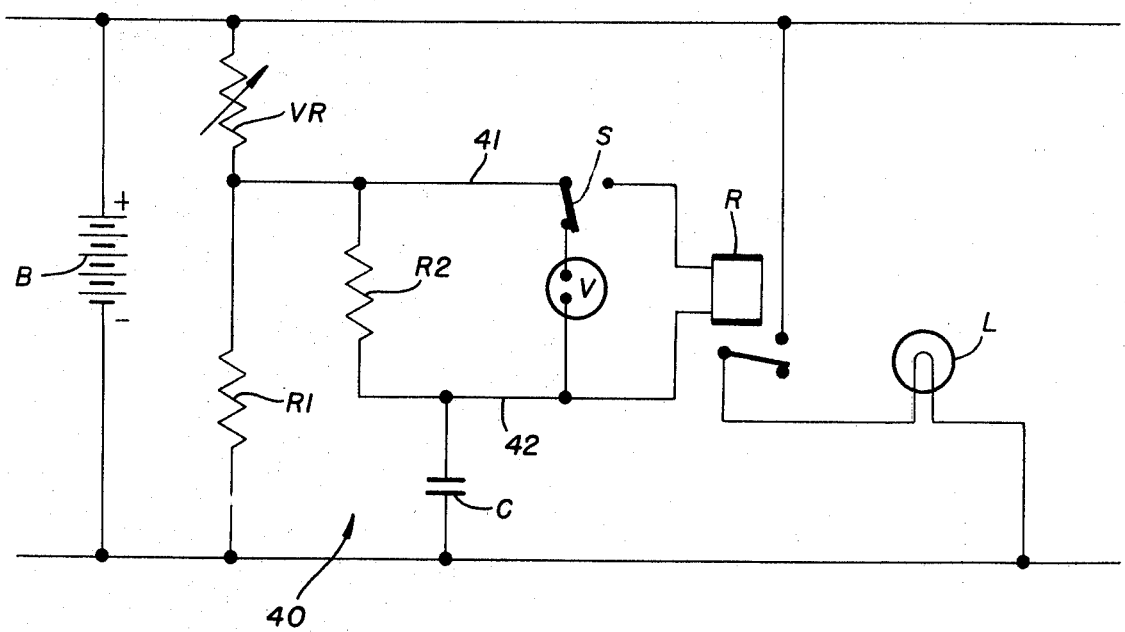
FIG. 2 is a schematic electrical wiring diagram of exemplary sensing and warning circuitry adapted for use in conjunction with the apparatus of FIG. 1.

Referring now to FIG. 2 of the drawings, an exemplary circuit for measuring and indicating changes in conductivity of the glass fabric 21 is generally indicated by the numeral 40. The resistance of the glass fabric between the spaced electrode 31 is represented by a variable resistor VR in the circuit 40 which is placed in series with a resistor R1 to provide a conducting path across the terminals of an electrical energy sourse. As shown, the energy source is a storage battery B which may be a standard 12 volt source or any other available power supply depending upon the application in which the measuring and indicating device 10 is to be employed. It is also necessary to proportionally reduce the voltage across R1 by means of a series resistance capacitance filter, consisting of a resistance R2, which is normally extremely small in comparison with R1, and a condenser C, which is placed in parallel with R1. The potential difference across R2 is available on leads 41 and 42 and may be visually presented on a conventional voltmeter V when connected by a contact arm of a single pole double throw switch S is shown in FIG. 2, or other appropriate switching device. Alternatively, the switch S may be shifted so that the contact arm assumes its other position so that when a predetermined potential difference is impressed across a relay R it is actuated to complete a circuit through the indicator L. This indicator L may be a lamp, as shown; however, an audio signal or combination audio and video signals may be provided, if desired. Alternatively, the switch S could be eliminated and either voltmeter V or relay R and indicator L may be employed individually depending upon the type of monitoring desired.

The size and ratings of the various components of the circuit 40 are varied according to such factors as the power source B, the extent of change in the variable resistor VR, and the size requirements of the entire unit, so that a noticeable deflection of the voltmeter V will accompany appreciable carbon monoxide concentrations and a large voltmeter V deflection and energization of relay R with attendant indicator actuation will result from concentrations which are dangerous, even over a period of time. The type of operation contemplated can be generally achieved with a resistor R1 of 10 megohms, resistor R2 of 3.9 kilohms, capacitor C of 2000 microfarads, a supply voltage B of 12 volts, and a variable resistance decreasing from $10^{13}$ ohms to $10^5$ ohms upon introduction of harmful gas concentrations to produce an indication of 500 millivolts on a high impedance valve voltmeter V. Numerous circuit designs producing results comparable to these values of measuring and indicating circuit 40 will be readily apparent to persons skilled in the art.

What is claimed is:

1. A process for measuring the concentration of carbon monoxide in a gas mixture comprising the steps of, introducing said gas mixture into a closed reaction chamber, exposing said gas mixture to nickel in a heated environment to convert the carbon monoxide to nickel carbonyl, heating the nickel carbonyl to its decomposition temperature in the presence of a filter to cause deposition thereon, and measuring the change in conductivity of the filter as indicia of the carbon monoxide concentration in the gas mixture.

2. A process according to claim 1 including the step of indirectly heating the filter by an adjacent heat source.

3. A process according to claim 1, including the step of indicating by signals the measuring of dangerous concentrations of carbon monoxide in a gas mixture.

4. Apparatus for detecting and warning of the presence of dangerous concentrations of carbon monoxide in a gas mixture comprising, closed reaction chamber means, volatilizing means in said reaction chamber means providing nickel at an elevated temperature to form gaseous nickel carbonyl, decomposing means in said reaction chamber means releasing and collecting nickel from the nickel carbonyl, and measuring means sensing the rate of nickel release as indica of carbon monoxide concentration.

5. Apparatus according to claim 4, including indicating means signaling dangerous concentrations of carbon monoxide detected by said measuring means.

6. Apparatus according to claim 4, wherein said closed reaction chamber means comprises, a central housing with inlet and outlet passages communicating therewith.

7. Apparatus according to claim 4, wherein said volatilizing means comprises, a heated nickel screen.

8. Apparatus according to claim 4, wherein said decomposing means comprises, an electrically nonconductive filter indirectly heated by a proximate heating element.

9. Apparatus according to claim 8, wherein said measuring means comprises, sensing means engaging said filter at spaced intervals to measure the electrical conductivity and circuit means converting changes in electrical conductivity of said filter in the presence of dangerous concentrations of carbon monoxide to appreciable electric signals.

10. Apparatus according to claim 4, wherein said closed reaction chamber means comprises a flow through central housing with inlet and outlet passages communicating therewith, wherein said volatilizing means comprises a heated nickel gauze screen electrically insulated from said reaction chamber means, wherein said decomposing means comprises a glas filter insulated from said reaction chamber means and a heating element spaced therefrom, wherein said measuring means comprises electrical contact arms engaging said glass filter at spaced intervals to provide a variable resistance element, an electric energy source, a resistor in series with said electric contact arms across said electric energy source, and a resistance capacitance filter in parallel with said resistor, and a relay sensing a predetermined output of said resistance capacitance filter and a signal element operated by said relay.

References Cited
McCarley et al., Anal. Chem. 28, #5, May 1956, pp. 880–882.

MORRIS O. WOLK, Primary Examiner

R. M. REESE, Assistant Examiner

U.S. Cl. X.R.

23—254, 255; 117—107.2; 118—9, 48; 324—71